US012692645B2

(12) United States Patent
Jeffery et al.

(10) Patent No.: US 12,692,645 B2
(45) Date of Patent: *Jul. 28, 2026

(54) HINGE ASSEMBLY FOR AN APPLIANCE LID AND INSTALLATION METHOD THEREFOR

(71) Applicant: WHIRLPOOL CORPORATION, Benton Harbor, MI (US)

(72) Inventors: James Jeffery, St. Joseph, MI (US); Paula Lobaccaro, St. Joseph, MI (US); Nicholas C. Schooley, Coloma, MI (US); David Walter, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 97 days.

This patent is subject to a terminal disclaimer.

(21) Appl. No.: 18/763,365

(22) Filed: Jul. 3, 2024

(65) Prior Publication Data

US 2024/0352653 A1 Oct. 24, 2024

Related U.S. Application Data

(62) Division of application No. 17/902,225, filed on Sep. 2, 2022, now Pat. No. 12,031,264, which is a division
(Continued)

(51) Int. Cl.
*D06F 39/14* (2006.01)
*E05D 3/02* (2006.01)
*E05D 7/10* (2006.01)

(52) U.S. Cl.
CPC ............... *D06F 39/14* (2013.01); *E05D 3/02* (2013.01); *E05D 7/1011* (2013.01);
(Continued)

(58) Field of Classification Search
CPC .......... D06F 39/14; D06F 23/04; D06F 37/24; D06F 37/18; D06F 37/28;
(Continued)

(56) References Cited

U.S. PATENT DOCUMENTS 1,425,995 A 8/1922 Mcgiveney
1,641,036 A 8/1927 Jachimstal
(Continued)

FOREIGN PATENT DOCUMENTS

BR 102013028409 A2 9/2015
CN 101988253 A 3/2011
(Continued)

OTHER PUBLICATIONS

WO2018042962 translation (Year: 2018).*
KR20100108060 translation (Year: 2010).*

*Primary Examiner* — Hiwot E Tefera
(74) *Attorney, Agent, or Firm* — Price Heneveld LLP

(57) ABSTRACT

A laundry appliance includes a cabinet having a top panel that defines an aperture for selectively accessing a treatment chamber defined within the cabinet. A lid is rotationally operable relative to the aperture of the top panel between open and closed positions. Hinge assemblies extend between the lid and the top panel. The hinge assemblies include a first hinge assembly. A second hinge assembly is selectively retractable into the lid to a retracted position. A biasing member biases the second hinge assembly out to an extended position. At least the second hinge assembly is operable to the retracted position to bypass a portion of the top panel to define an installed position where the first and second hinge assemblies are engaged with respective hinge receptacles of the top panel.

13 Claims, 17 Drawing Sheets

Related U.S. Application Data of application No. 16/730,313, filed on Dec. 30, 2019, now Pat. No. 11,466,395.

(52) U.S. Cl.
CPC ................ *E05D 2007/1027* (2013.01); *E05D 2007/1094* (2013.01); *E05Y 2201/214* (2013.01); *E05Y 2600/50* (2013.01); *E05Y 2900/312* (2013.01)

(58) Field of Classification Search
CPC ......... E05Y 2900/312; E05Y 2201/214; E05Y 2600/50; E05D 3/02; E05D 7/1011; E05D 7/1005; E05D 2007/1027; E05D 2007/1094
See application file for complete search history.

(56) References Cited

U.S. PATENT DOCUMENTS

| | | | | |
|---|---|---|---|---|
| 1,904,110 | A | 4/1933 | Willmann | |
| 3,921,254 | A | 11/1975 | Foster, Jr. et al. | |
| 4,115,901 | A | 9/1978 | Schmidt | |
| 5,253,493 | A | 10/1993 | Ohashi | |
| 5,682,642 | A | 11/1997 | Michael | |
| 5,911,264 | A | 6/1999 | Smrke et al. | |
| 6,205,616 | B1 | 3/2001 | Hwang | |
| 6,409,037 | B1 | 6/2002 | Lin et al. | |
| 9,394,645 | B2 | 7/2016 | Park et al. | |
| 10,246,922 | B2 | 4/2019 | Mora et al. | |
| 2006/0032021 | A1 * | 2/2006 | Fukuo | E05D 7/1011 16/298 |
| 2008/0128156 | A1 | 6/2008 | Kuwajima et al. | |
| 2010/0000046 | A1 | 1/2010 | Park et al. | |
| 2011/0050060 | A1 * | 3/2011 | Kim | E05D 11/06 312/228 |
| 2011/0062837 | A1 | 3/2011 | Kim et al. | |
| 2014/0125210 | A1 | 5/2014 | Park et al. | |
| 2016/0251883 | A1 * | 9/2016 | Wang | A47L 15/4259 292/179 |
| 2017/0122020 | A1 * | 5/2017 | Collene | E05F 3/104 |
| 2018/0080160 | A1 | 3/2018 | Mora | |
| 2018/0179690 | A1 | 6/2018 | Cheon et al. | |
| 2021/0198835 | A1 | 7/2021 | Jeffery et al. | |
| 2021/0198928 | A1 | 7/2021 | Patil et al. | |

FOREIGN PATENT DOCUMENTS

| | | | | | |
|---|---|---|---|---|---|
| CN | 103015125 | A | | 4/2013 | |
| CN | 204251895 | U | | 4/2015 | |
| CN | 207376304 | U | | 5/2018 | |
| CN | 208440853 | U | | 1/2019 | |
| DE | 3709331 | A | * | 9/1988 | |
| EP | 844352 | B1 | | 5/1998 | |
| ES | 2154088 | A1 | | 3/2001 | |
| FR | 2341027 | A | * | 10/1977 | |
| FR | 2577976 | A1 | * | 8/1986 | E05D 15/502 |
| GB | 2391257 | A | | 2/2004 | |
| JP | 09049361 | A | * | 2/1997 | E05D 7/081 |
| KR | 20090113975 | A | * | 11/2009 | E05D 3/02 |
| KR | 20100108060 | A | * | 10/2010 | D06F 37/28 |
| KR | 20140052716 | A | | 5/2014 | |
| WO | WO-2018042962 | A1 | * | 3/2018 | D06F 37/28 |

* cited by examiner

Method 400 for Installing a Lid onto a Cabinet for an Appliance

Method 500 for Installing a Lid onto a Cabinet for an Appliance

Method 600 for Installing a Lid onto a Cabinet for an Appliance

HINGE ASSEMBLY FOR AN APPLIANCE LID AND INSTALLATION METHOD THEREFOR

CROSS-REFERENCE TO RELATED APPLICATION

The present application is a divisional of U.S. patent application Ser. No. 17/902,225 filed Sep. 2, 2022, entitled HINGE ASSEMBLY FOR AN APPLIANCE LID AND INSTALLATION METHOD THEREFOR, now U.S. Pat. No. 12,031,264, which is a divisional of U.S. patent application Ser. No. 16/730,313 filed Dec. 30, 2019, entitled HINGE ASSEMBLY FOR AN APPLIANCE LID AND INSTALLATION METHOD THEREFOR, now U.S. Pat. No. 11,466,395, the entire disclosure of which is hereby incorporated herein by reference.

BACKGROUND OF THE DISCLOSURE

The present disclosure generally relates to consumer appliances, and more specifically, to a lid for a consumer appliance having a hinge assembly and an installation method therefor that minimizes stresses on the various hinge mechanisms of the appliance lid.

SUMMARY OF THE DISCLOSURE

According to one aspect of the present disclosure, a laundry appliance includes a cabinet having a top panel that defines an aperture for selectively accessing a treatment chamber defined within the cabinet. A lid is rotationally operable relative to the aperture of the top panel between open and closed positions. Hinge assemblies extend between the lid and the top panel. The hinge assemblies include a first hinge assembly and a second hinge assembly that is selectively retractable into the lid to a retracted position. A biasing member biases the second hinge assembly out to an extended position. At least the second hinge assembly is operable to the retracted position to bypass a portion of the top panel to define an installed position where the first and second hinge assemblies are engaged with respective hinge receptacles of the top panel.

According to one aspect of the present disclosure, a method for installing a lid onto an appliance includes positioning a guide member on a cabinet. A sloped portion of the guide member is aligned to slope downward and toward a hinge receptacle. A first hinge of said lid is positioned into an opposing hinge receptacle of the cabinet. A second hinge of said lid slides along the sloped portion and toward the hinge receptacle. The sloped portion biases the second hinge to a retracted position within said lid. The second hinge is engaged with the hinge receptacle. A spring of the second hinge biases the second hinge outward and into the hinge receptacle.

According to another aspect of the present disclosure, a method for installing a lid onto an appliance includes positioning a guide structure on a cabinet. A sloped portion of the guide structure is aligned to slope downward and toward a lid opening of the cabinet. At least one of a first hinge and a second hinge are positioned on the sloped portion. The lid is slid downward and along the sloped portion and toward the lid opening. The sloped portion biases the first hinge and the second hinge toward a retracted position. The lid is disposed below the sloped portion and into the lid opening. The first hinge and the second hinge are each biased outward toward respective hinge receptacles of the cabinet. The first and second hinges are engaged within the respective hinge receptacles to secure said lid to the cabinet.

According to yet another aspect of the present disclosure, a method for installing a lid onto an appliance includes positioning a guide member on a cabinet. A sloped portion of the guide member is aligned to slope downward and toward a lid opening of the cabinet. A first hinge is positioned within a hinge receptacle of respective hinge receptacles within the lid opening. A second hinge is positioned on the sloped portion. The lid is rotated about the respective hinge receptacle and in a downward direction. The second hinge slides along the sloped portion and toward the lid opening. The sloped portion biases at least the second hinge toward a retracted position. The lid is disposed below the sloped portion and into the lid opening. The first hinge and the second hinge are each biased outward toward the respective hinge receptacles of the cabinet. The first and second hinges are engaged within the respective hinge receptacles to secure said lid to the cabinet.

These and other features, advantages, and objects of the present disclosure will be further understood and appreciated by those skilled in the art by reference to the following specification, claims, and appended drawings.

Figure 1:
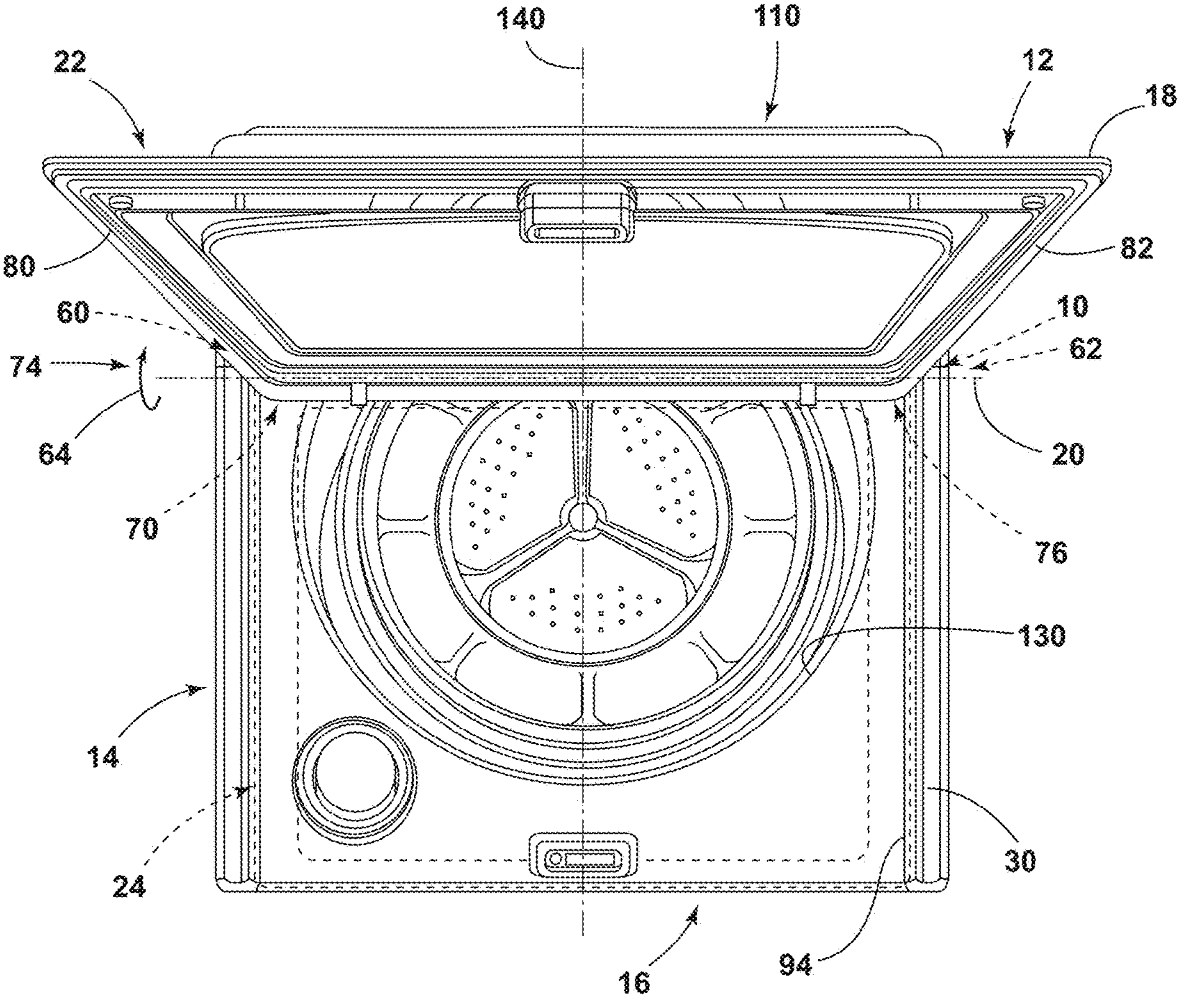
FIG. 1 is a top perspective view of an appliance incorporating an aspect of a hinge assembly for attaching the lid to the appliance cabinet.
Figure 2:
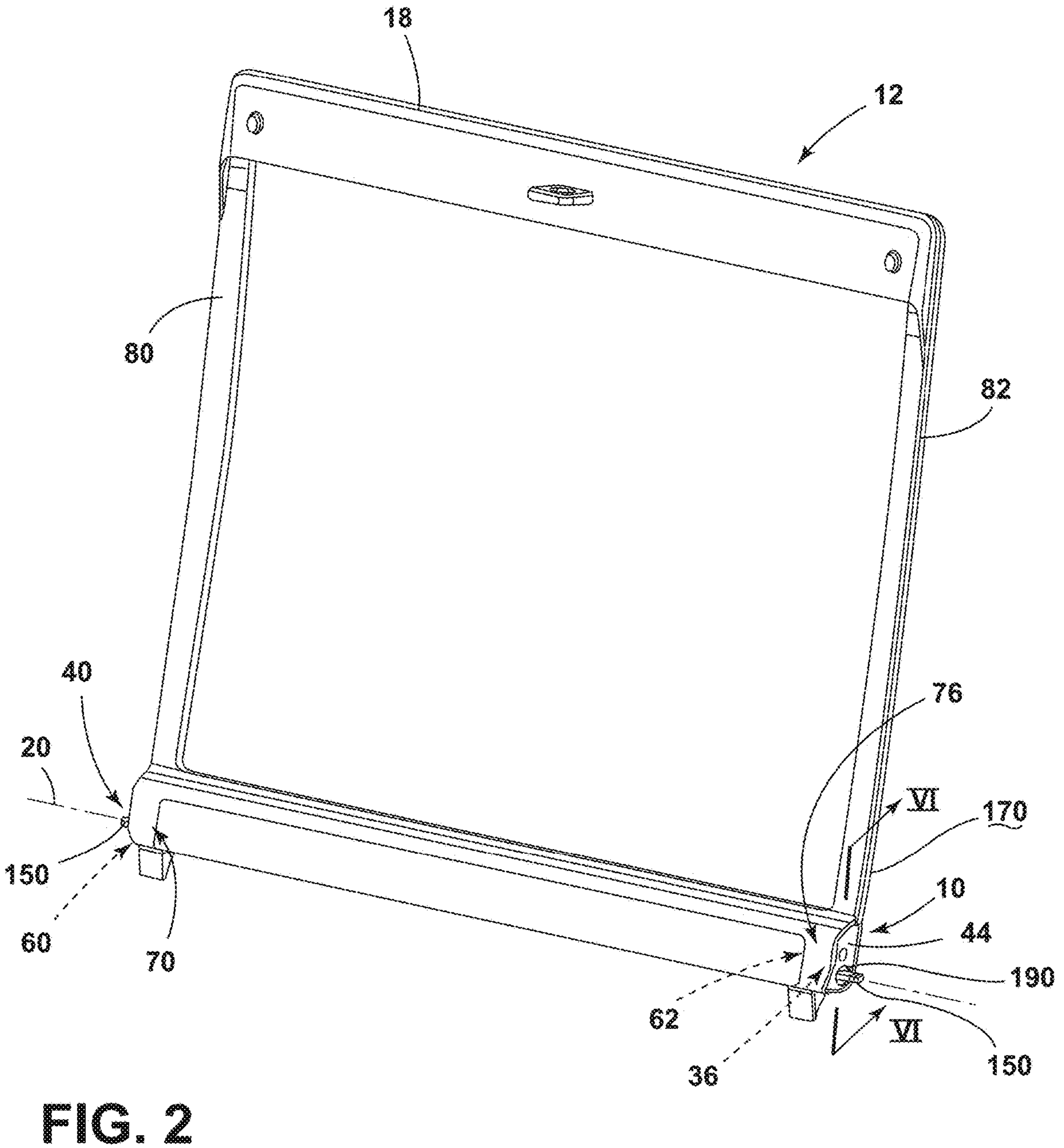
FIG. 2 is a side perspective view of a lid for an appliance that incorporates an aspect of the hinge assembly.
Figure 3:
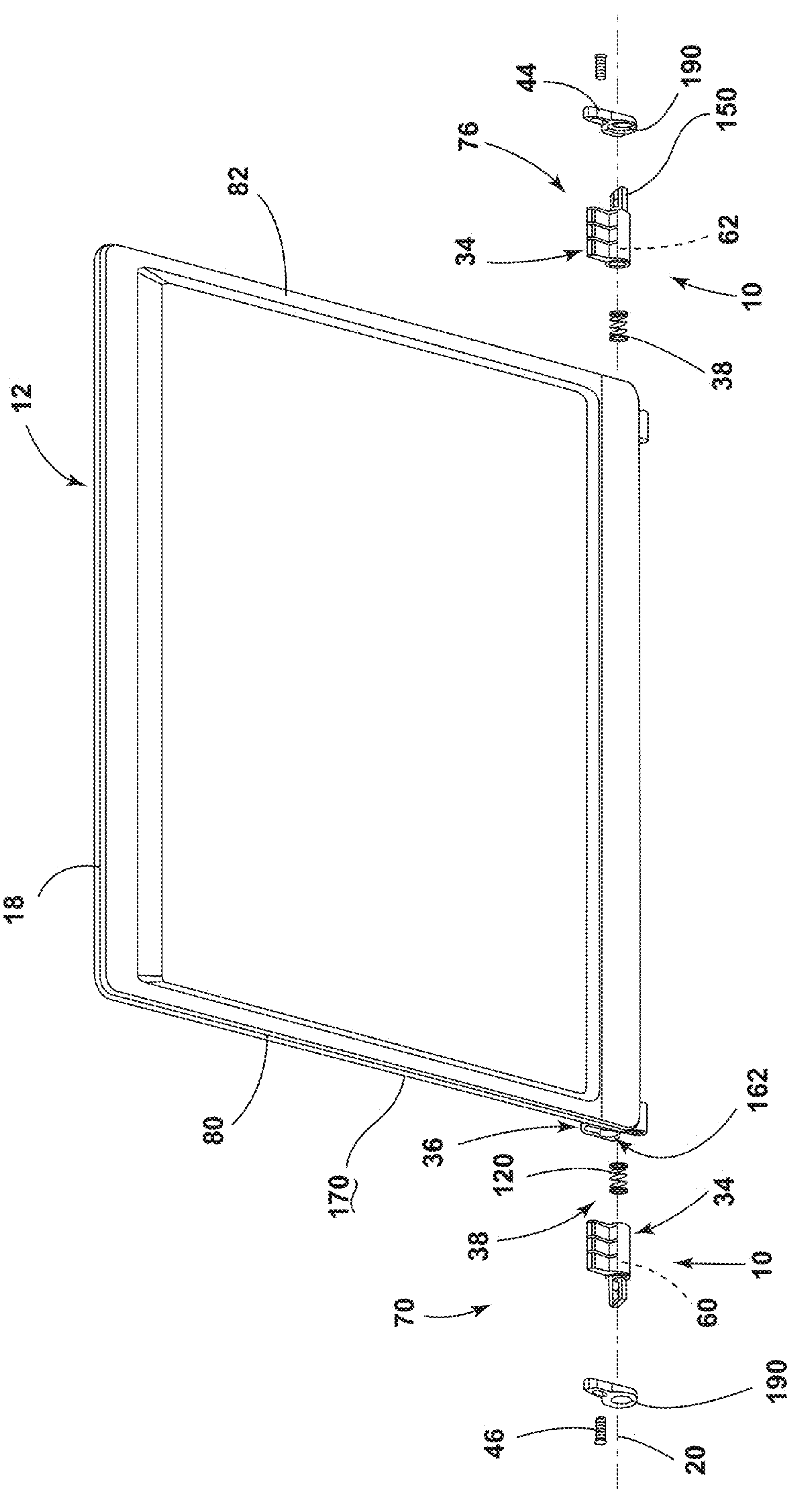
FIG. 3 is an exploded perspective view of the lid of FIG. 2.
Figure 4:
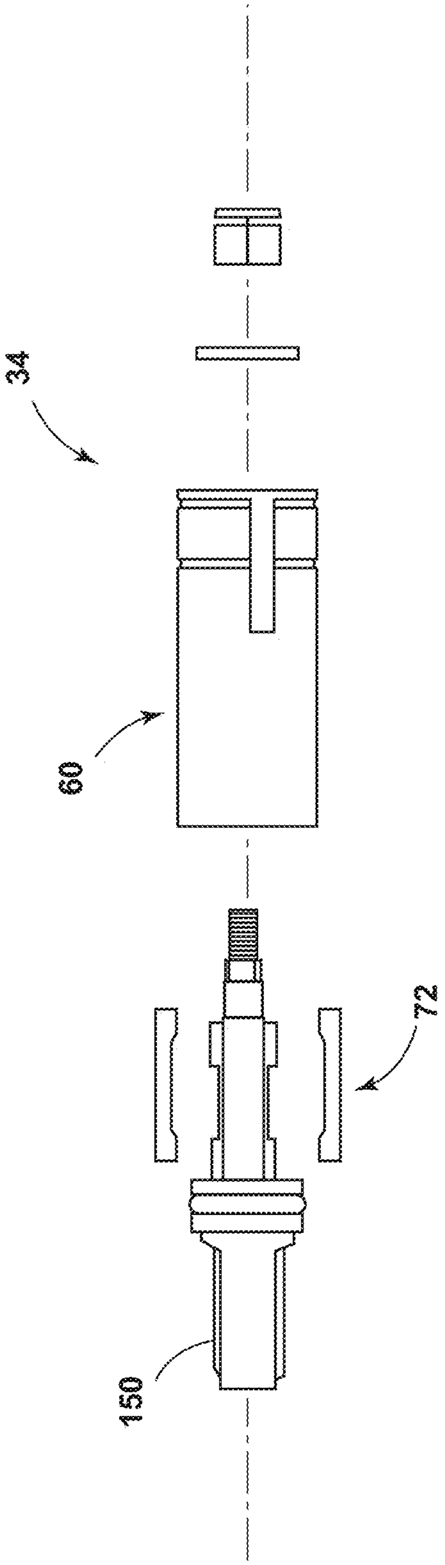
FIG. 4 is an exploded perspective view of an aspect of a damper incorporated within a hinge assembly.
Figure 5:
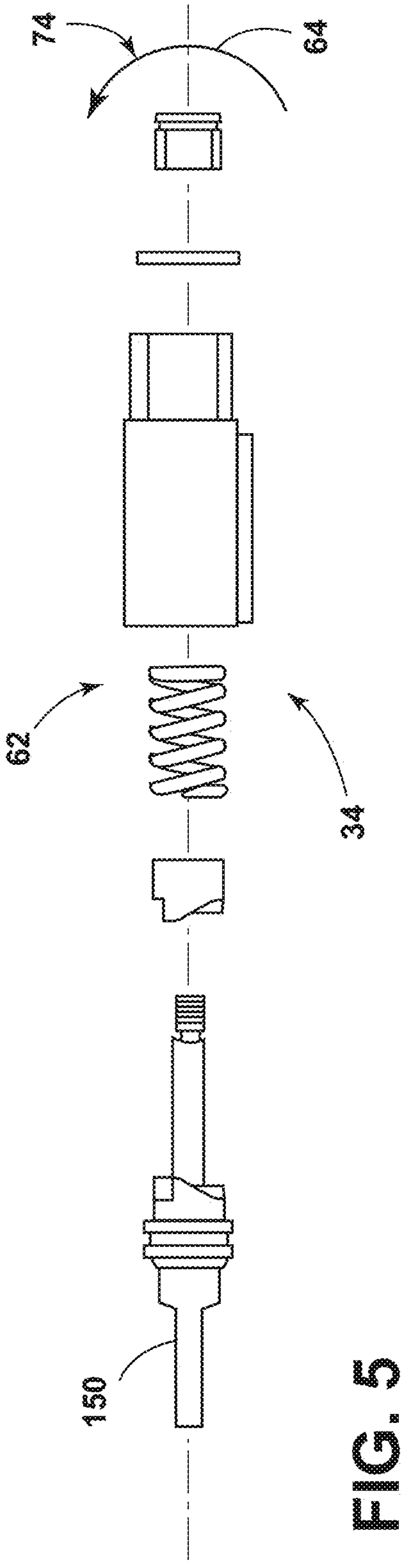
FIG. 5 is an exploded perspective view of an aspect of a lift-assist mechanism for use with the hinge assembly.
Figure 6:
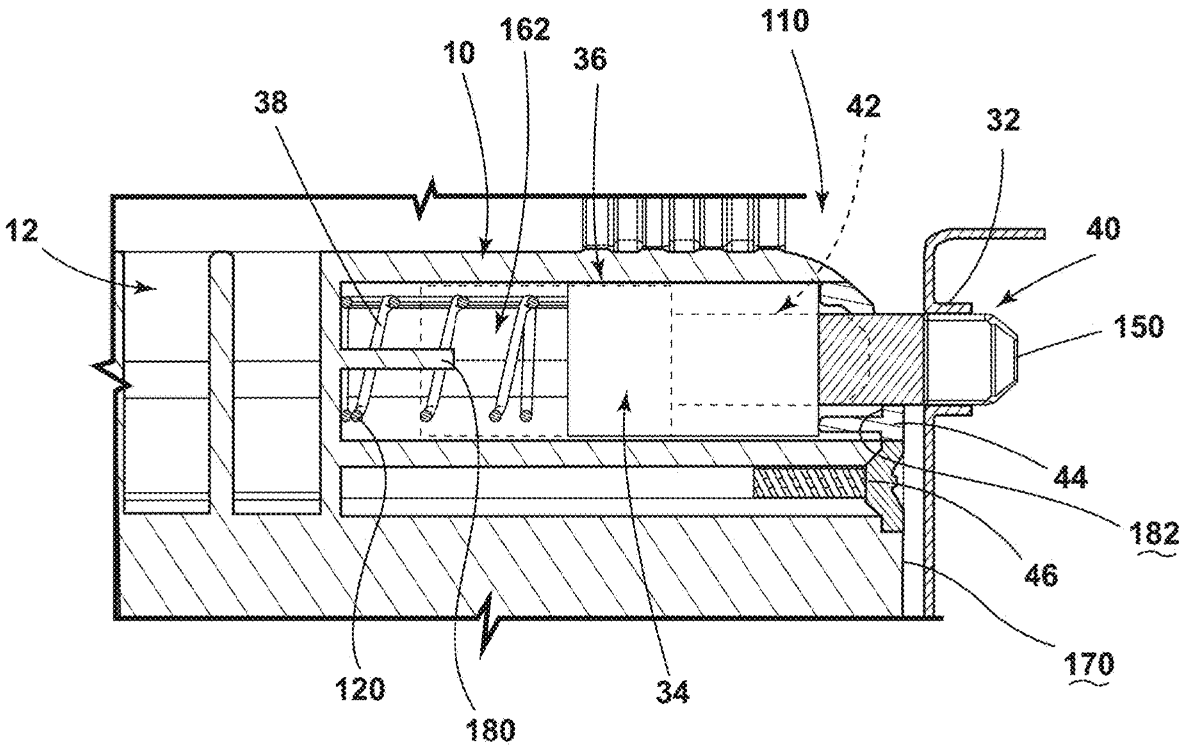
FIG. 6 is a cross-sectional view of the lid of FIG. 2 taken along line VI-VI and showing the hinge assembly in an extended position and installed within a cabinet for an appliance.
Figure 7:
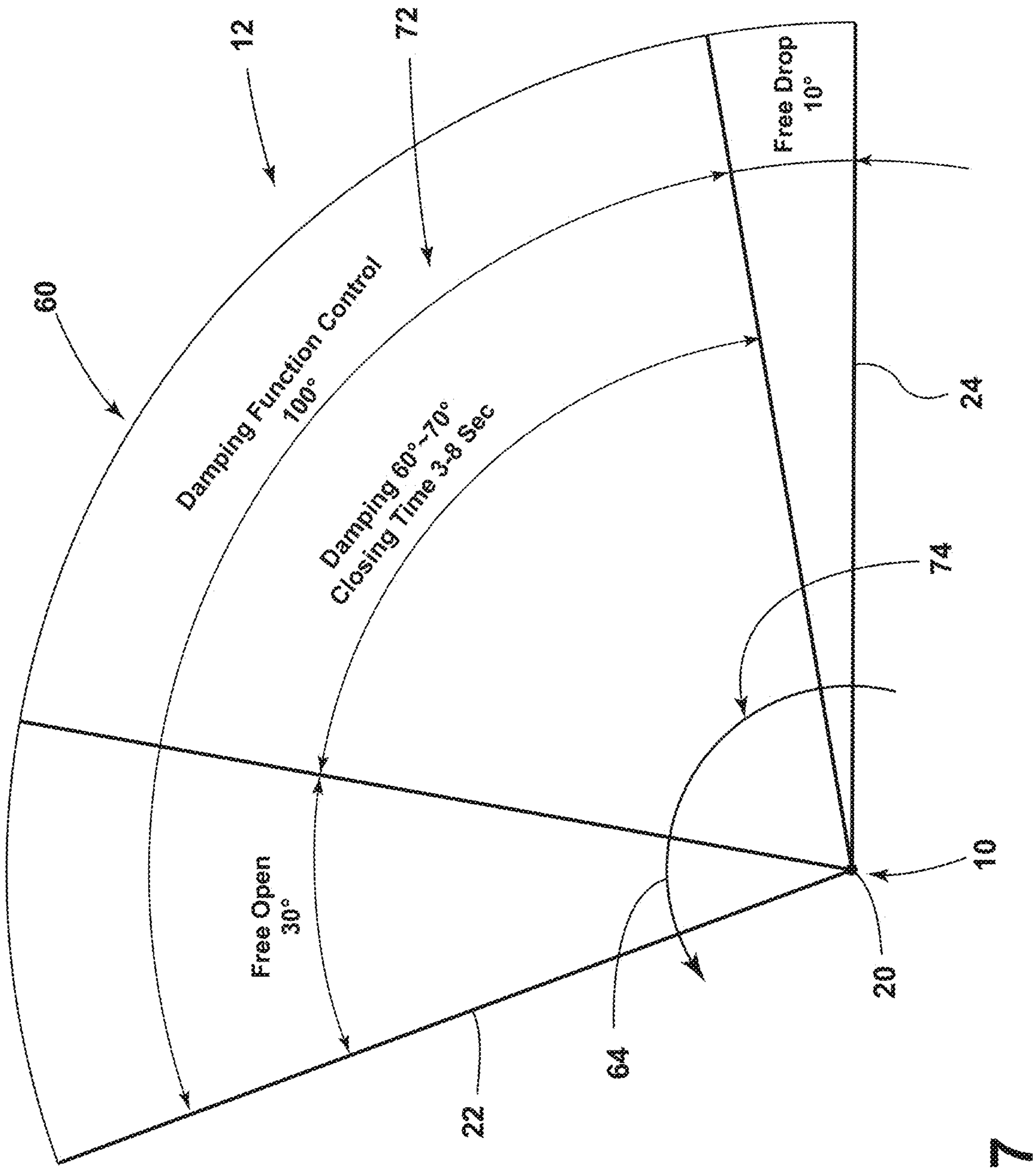
FIG. 7 is an exemplary motion diagram showing interaction of a one-way damper and a lift-assist mechanism installed within a lid for an appliance.
Figure 8:
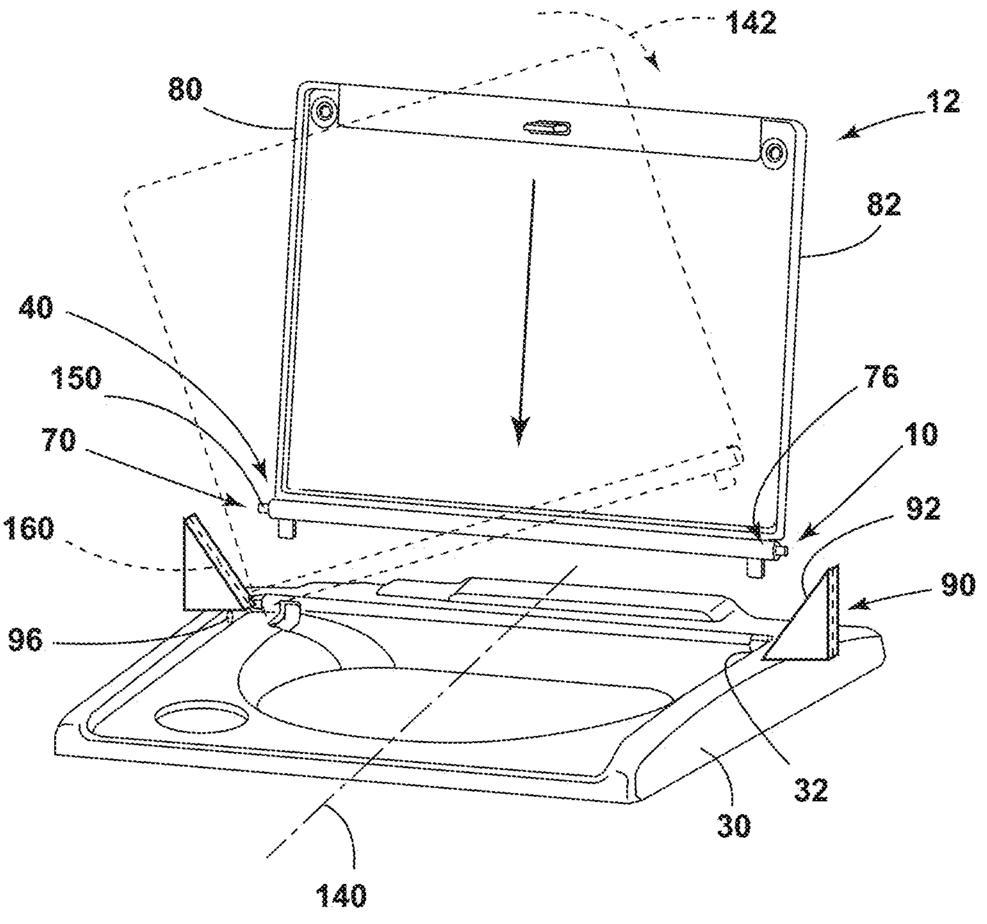
FIG. 8 is a schematic perspective view of a lid being installed within a top panel for an appliance, including at least one aspect for the method.
Figure 9:
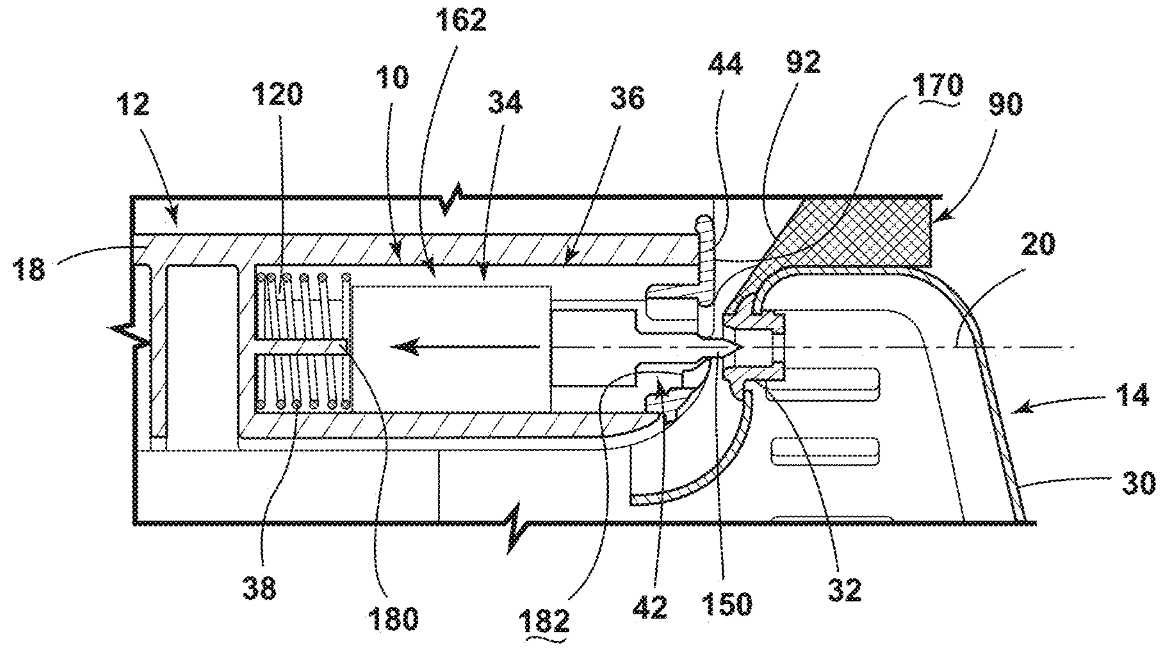
FIG. 9 is a cross-sectional view of a lid being installed within a cabinet for an appliance and showing the hinge member in a retracted position.
Figure 10:
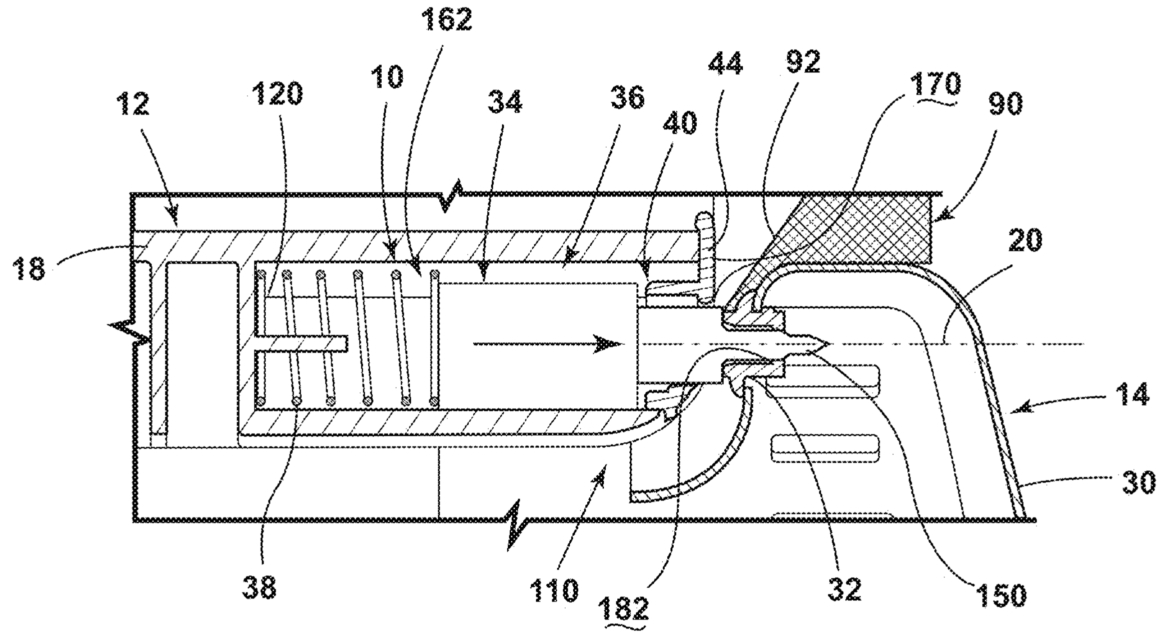
FIG. 10 is a cross-sectional view of the hinge assembly of FIG. 9 showing the hinge member in the extended position.
Figure 11:
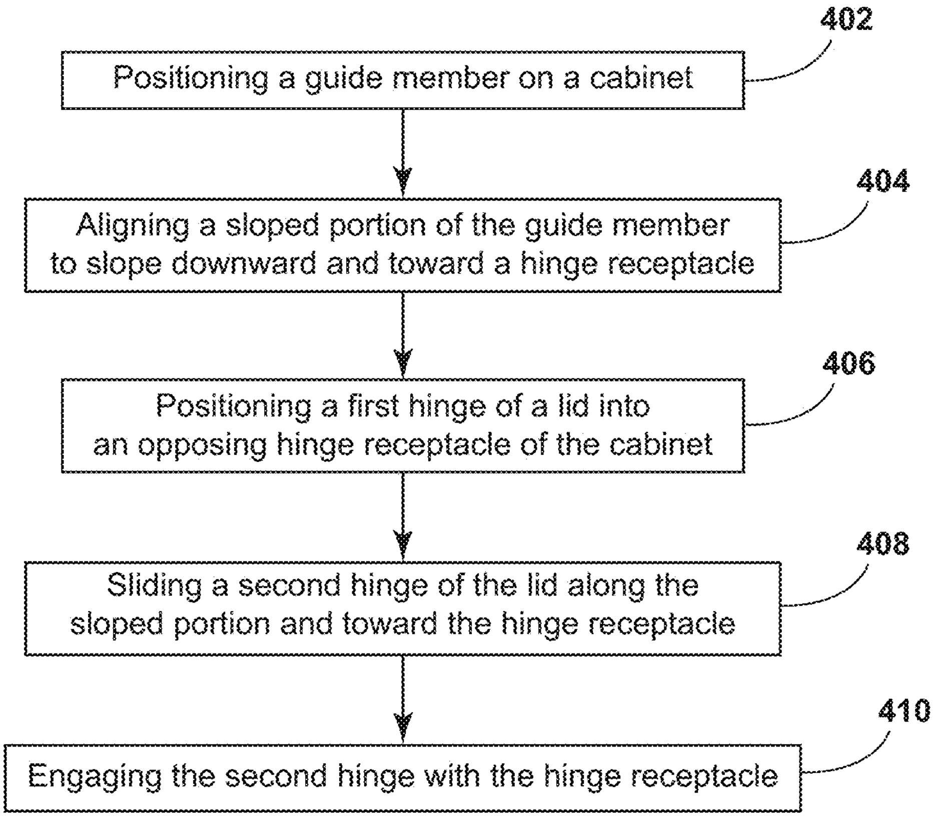
FIG. 11 is a linear flow diagram illustrating a method for installing a lid onto an appliance cabinet.
Figure 12:
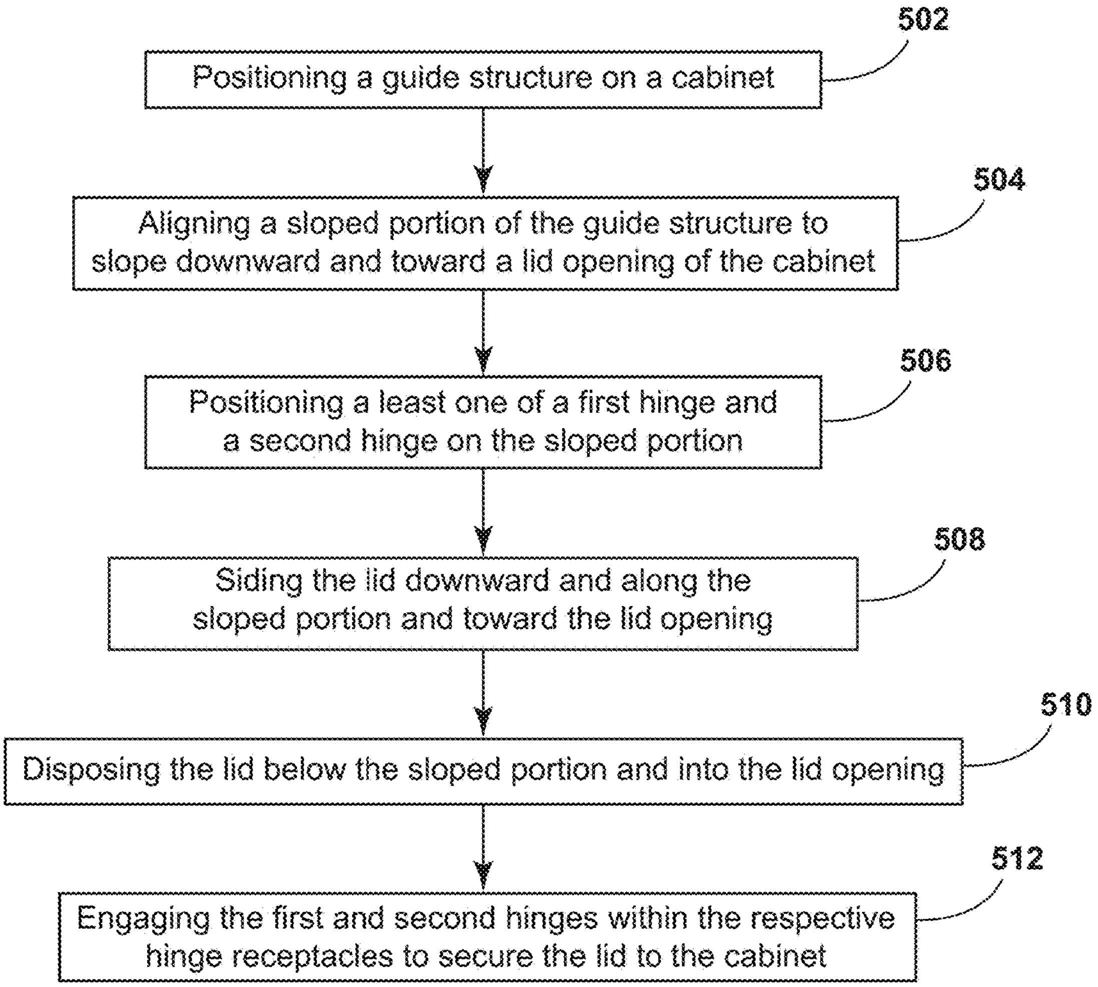
FIG. 12 is a linear flow diagram illustrating a method for installing a lid onto an appliance cabinet.
Figure 13:
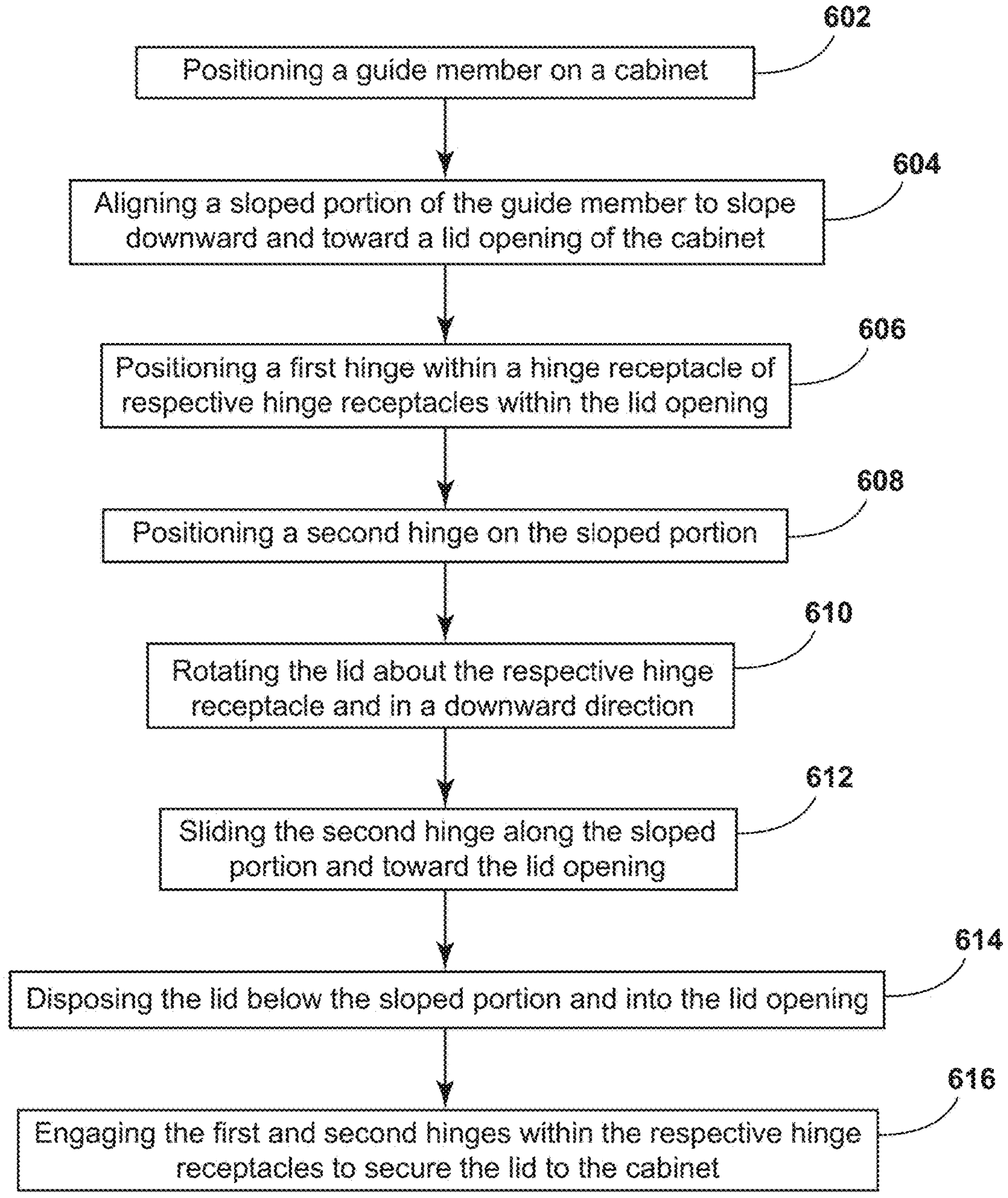
FIG. 13 is a linear flow diagram illustrating a method for installing a lid onto an appliance cabinet.

The components in the figures are not necessarily to scale, emphasis instead being placed upon illustrating the principles described herein.

DETAILED DESCRIPTION

The present illustrated embodiments reside primarily in combinations of method steps and apparatus components related to a hinge assembly for connecting to an operable panel to an appliance cabinet and for installing the operable panel onto the appliance cabinet. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10, reference numeral 10 generally refers to a hinge assembly for an operable panel 12 that is rotationally positioned onto a structural cabinet 14 for an appliance 16. Typically, the operable panel 12 is in the form of a lid 18 that rotates about a horizontal rotational axis 20 between a lowered or closed position 24 and a raised or open position 22. Such a configuration is typically disposed within a top-load laundry appliance 16. It is also contemplated that such a configuration of the hinge assembly 10 and operable panel 12 disclosed herein can be used within any one of various appliances 16 that can include, but are not limited to, dishwashers, refrigerators, freezers, ovens, small appliances, countertop appliances, and other similar residential and commercial appliances.

Referring again to FIGS. 1-10, a top-load laundry appliance 16 is exemplified, where a lid 18 is coupled with a top panel 30 for the cabinet 14. The lid 18 includes the hinge assembly 10 that is positioned at opposing sides of the lid 18 for engaging respective hinge receptacles 32 defined within the top panel 30 for the appliance 16. The hinge assembly 10 includes opposing hinge members 34 that are set within respective hinge cavities 36 that are defined within the lid 18. Each hinge member 34 typically includes a biasing member 38 that biases the hinge member 34 outward to an extended position 40, to engage the hinge receptacle 32 of the top panel 30. Stated another way, one or both of the hinge members 34 can include the biasing member 38. The placement and configuration of the biasing members 38 can determine the method for installing the lid 18 onto the top panel 30. This biasing member 38 can be compressed so that the hinge member 34 can be moved to a retracted position 42 during installation of the lid 18 onto a top panel 30 or for servicing of the lid 18. Each hinge assembly 10 also includes a cap 44 that conceals the hinge cavity 36 and a fastener 46 that attaches the cap 44 to the lid 18 for securing the cap 44 at the hinge cavity 36. Using the hinge cavity 36 and the cap 44, the damper 60 can be held in place within the hinge cavity 36 without the use of fasteners. This is also true of the lift-assist mechanism 62.

As exemplified in FIGS. 3-6, each hinge assembly 10 can include a damper 60 that is used to slow rotation of the lid 18 as it moves at least from the open position 22 to the closed position 24. The hinge assembly 10 can also include a lift-assist mechanism 62 that biases the lid 18 in a rotationally upward direction 64 toward the open position 22. In this manner, the lift-assist mechanism 62 assists a user in lifting the door from the closed position 24 and rotating the door in the upward direction 64 to the open position 22. It is contemplated that the various hinge assemblies 10 of the lid 18 can include each of a damper 60 and a lift-assist mechanism 62 for both assisting in moving the door to the open position 22 and also slowing rotation of the door from the open position 22 back to the closed position 24.

As exemplified in FIGS. 2-7, the lid 18 can include a first hinge assembly 70 in the form of a damper 60, typically a one-way rotary damper 60 that operates in a single rotational direction. In such an embodiment, this one-way damper 60 includes a regulating mechanism 72 that operates to slow rotation of the lid 18 from the open position 22 to the closed position 24. Conversely, using the one-way rotary damper 60, as the lid 18 is operated from the closed position 24 and moves upward to the open position 22, the regulating mechanism 72 within the one-way rotary damper 60 is temporarily disengaged. This disengagement of the regulating mechanism 72 for the one-way rotary damper 60 allows the lid 18 to move freely or substantially freely from the closed position 24 to the open position 22.

Additionally, the hinge assemblies 10 for the lid 18 include a lift-assist mechanism 62 that assists the user in moving the lid 18 from the closed position 24 to the open position 22. This lift-assist mechanism 62 exerts a consistent biasing force 74 toward the open position 22. Accordingly, this consistent biasing force 74 also works in conjunction with the one-way damper 60 for slowing rotation of the lid 18 as it moves from the open position 22 toward the closed position 24.

As exemplified in FIGS. 2-7, the lid 18 can include a damper 60 at a first side 80 of the lid 18 and can include a lift-assist mechanism 62 at the second side 82 of the lid 18. The damper 60 and the lift-assist mechanism 62 work cooperatively and in combination to provide various damping-type functions and lift-assist functions during operation of the lid 18 between the open and closed positions 22, 24, as exemplified in the schematic of FIG. 7.

According to various aspects of the device, it is contemplated that the hinge assemblies 10 for the lid 18 can include various features that include both the damper 60 and a lift-assist mechanism 62. It is also contemplated that no damper 60 is included, but various lift-assist mechanisms 62 are incorporated within the various hinge assemblies 10 for the lid 18. Additionally, the various hinge assemblies 10 can be oriented to operate along a rotational axis 20 that is oriented in a horizontal or vertical direction, depending upon the particular design of the appliance 16 receiving the lid 18, door, or other rotationally operable panel 12 for the appliance 16.

Referring now to FIGS. 1-11, having described various aspects of the hinge assembly 10 and the lid 18 that receives the hinge assembly 10, a method 400 is disclosed for installing a lid 18 onto a cabinet 14 for an appliance 16. According to the method 400, various guide members 90 are installed onto the appliance cabinet 14 and typically near the hinge receptacles 32 that are defined within the structural cabinet 14 (step 402). In positioning the guide members 90, a sloped portion 92 of the guide member 90 is aligned to slope downward and towards the hinge receptacle 32 (step 404). In certain aspects of the device, the first hinge assembly 70 of the lid 18 is positioned into an opposing hinge receptacle 96 of the appliance cabinet 14 (step 406). The second hinge assembly 76 of the lid 18 is operated in a sliding fashion along the sloped portion 92 of the guide member 90 (step 408). This sliding operation of the second hinge assembly 76 is moved towards the hinge receptacle 32. The sloped portion 92 of the guide member 90 biases the second hinge assembly 76 to the retracted position 42 in the lid 18. In certain aspects of the device, the sloped portion 92 biases the second hinge assembly 76 to the retracted position 42 and also partially biases the first hinge assembly 70 to a retracted position 42. As the second hinge assembly 76 translates along the sloped portion 92, the second hinge assembly 76 will pass into a lid 18 opening of the structural cabinet 14 and engage the second hinge assembly 76 with the hinge receptacle 32 (step 410). The biasing member 38, typically a spring, of the second hinge assembly 76, biases the second hinge assembly 76 outward to the extended position 40 and into the hinge receptacle 32. After installation is complete, the guide member 90 can be removed.

Referring again to FIGS. 1-11, in a configuration of the device and method where the first hinge assembly 70 is slid into an opposing hinge receptacle 96 of the top panel 30 of the appliance cabinet 14, the lid 18 will rotate about this engagement between the first hinge assembly 70 and the opposing hinge receptacle 96 as it moves toward an installed position 110 within a lid 18 opening of a top panel 30 for the cabinet 14. During this rotational operation, the first hinge assembly 70 acts as a fulcrum for pushing the lid 18 in a downward direction 142 to slide the second hinge assembly 76 along the sloped portion 92 and toward the installed position 110 of the lid 18. As discussed above, the first and second hinge assemblies 70, 76 can be in the form of a damper 60, lift-assist mechanism 62, both a damper 60 and lift-assist mechanism 62, or combinations thereof.

Typically, where the first hinge assembly 70 is placed within the opposing hinge receptacle 96 and the lid 18 is rotated around this engagement, the opposing hinge assemblies 10 of the lid 18 are defined by different hinge mechanisms. Stated another way, the first hinge assembly 70 can be in the form of one of a damper 60 and a lift-assist mechanism 62, and the second hinge assembly 76 is in the form of the other of the damper 60 and the lift-assist mechanism 62. Where differing hinge assemblies 10 are included within opposing sides of the lid 18, installation of the lid 18 into the installed position 110 by moving each of the opposing hinge assemblies 10 at the same time into the installed position 110 can, in certain conditions, result in the lid 18 shifting away from a central axis 140 and toward one of the hinge receptacles 32 due to a stronger biasing mechanism that is associated with the lift-assist mechanism 62. Such an uneven movement of the lid 18 away from a central axis 140 can result in scratching of the lid 18 against the top panel 30 or other similar banging and potential damage to the appliance 16 during manufacture and servicing. By placing the first hinge assembly 70 into the opposing hinge receptacle 96 and then slidably operating the second hinge assembly 76 along the sloped surface, these uneven biasing forces can be accounted for during the rotation of the lid 18 into the installed position 110.

Referring again to FIGS. 8-11, one or both of the first and second hinge assemblies 70, 76 can include an installation spring 120 that is separate from internal springs that are positioned within the hinge member 34. These installation springs 120 can be used to provide a symmetrical biasing force with respect to the central axis 140 against each of the opposing hinge members 34 during installation of the lid 18. Such an installation process where each of the first and second hinge assemblies 70, 76 are installed simultaneously into the respective hinge receptacles 32 will be described more fully below.

During positioning of the guide member 90, the guide member 90 can be selectively secured to a surface of the top panel 30 or other portion of the structural cabinet 14. This attachment can be through magnetic attachments, interference-type engagements, or other similar attachment mechanisms and methods. The attachment of the guide member 90 with the structural cabinet 14 is intended to be in a manner that minimizes or otherwise eliminates any damage to the structural cabinet 14 during installation of the lid 18. Accordingly, it is contemplated that various protection layers can be positioned between the guide member 90 and the surface of the appliance cabinet 14 during installation and use of the various guide members 90. As exemplified in FIG. 8, the guide member 90 is secured to a top panel 30 at an aperture 130 of the top panel 30 and near a lid opening 94 for receiving the lid 18 in a closed position 24.

Referring now to FIGS. 1-10 and 12, a method 500 is disclosed for installing a lid 18 onto an appliance cabinet 14. According to the method 500, a guide structure, which can include one or more guide members 90, is positioned on the structural cabinet 14 (step 502). According to the method 500, a sloped portion 92 of the guide structure is aligned to slope downward and toward a lid opening 94 of the cabinet 14 (step 504). As discussed above, the lid opening 94 is a recess within the top panel 30 of the appliance 16 that receives the lid 18 in the closed position 24. Typically, the hinge receptacles 32 are defined within the lid opening 94 to receive the opposing hinge members 34 of the lid 18. According to the method 500, at least one of the first and second hinge assemblies 70, 76, and typically both of the first and second hinge assemblies 70, 76, are positioned on the sloped portions 92 of the guide structure (step 506). In such an embodiment, the guide structure includes opposing guide members 90 that define respective sloped portions 92 that slope toward the respective hinge receptacles 32 set within the lid opening 94 of the top panel 30. According to the method 500, the lid 18 is operated in a sliding motion and in a downward direction 142 along the respective sloped portions 92 and toward the lid opening 94 (step 508). The sloped portions 92 bias the first and second hinge assemblies 70, 76 toward respective retracted positions 42 so that the hinge members 34 can pass by the structure of the cabinet 14 and be aligned with the respective hinge receptacles 32 defined within the top panel 30.

Referring again to FIGS. 1-10 and 12, the method 500 includes a step of disposing the lid 18 below the respective sloped portions 92 and into the lid opening 94 (step 510). In this position, the first hinge assembly 70 and the second hinge assembly 76 are each biased outward toward the respective hinge receptacles 32 of the cabinet 14. In this manner, the first and second hinge assemblies 70, 76 are engaged within respective hinge receptacles 32 to secure the lid 18 to the cabinet 14 in the installed position 110 (step 512). After installation of the lid 18, the various guide members 90 can be removed.

In the installed position 110, it is typical that a pin 150 of each hinge member 34 is rotationally fixed within the respective hinge receptacle 32 of the top panel 30. In such a configuration, the hinge member 34 within the hinge housing 36 of the lid 18 rotationally operates about the pin 150 as the lid 18 moves between the open and closed position 22, 24. This rotational operation of the hinge member 34 with respect to the pin 150 operates the various dampening and lift-assist features of the various hinge assemblies 10 for the lid 18.

Referring again to FIGS. 1-10 and 12, where the opposing hinge members 34 include a damper 60 and a lift-assist mechanism 62, different biasing forces may be required to move each of the pins 150 for the hinge assemblies 10 to the retracted position 42. In such an embodiment, it is contemplated that the sloped portions 92 of the opposing guide members 90 may include different slopes that provide a different opposing biasing force against each hinge assembly 10. These differing slopes of the opposing guide members 90 serve to bias each of the opposing hinge members 34 to the retracted position 42, while also maintaining the lid 18 within a central position with respect to the lid opening 94 and the respective hinge receptacles 32. The configuration of the opposing guide members 90 is utilized to place each of the opposing hinge members 34 in the retracted position 42 as the lid 18 moves in the transition from the guide member 90, into the lid opening 94, and into the installation position where each of the opposing hinge members 34 are installed within the respective hinge receptacles 32. During this movement of the lid 18, it is intended that the lid 18 is meant to maintain an alignment with the central axis 140 of the lid opening 94 to prevent unintended engagement between the surface of the lid 18 and the surface of the appliance cabinet 14 that may result in scratching or other damage.

Referring now to FIGS. 1-10 and 13, a method 600 is disclosed for installing a lid 18 onto a cabinet 14 for an appliance 16. According to the method 600, a guide member 90 is positioned on a structural cabinet 14 (step 602). A sloped portion 92 of the guide member 90, or the opposing guide members 90, are aligned to slope downward and toward a lid opening 94 of the cabinet 14 (step 604). A first hinge assembly 70 is positioned within a hinge receptacle 32 of the respective hinge receptacles 32 that are located within the lid opening 94 (step 606). The second hinge assembly 76 is then positioned on the sloped portion 92 of the guide member 90 (step 608). The lid 18 is then rotated about the respective hinge receptacle 32 and in a downward direction 142 (step 610). According to the method 600, the second hinge assembly 76 is operated in a sliding fashion along the sloped portion 92 and toward the lid opening 94 to achieve an installed position 110 (step 612). The sloped portion 92 serves to bias at least the second hinge assembly 76 toward the retracted position 42. As discussed above, operation of the second hinge assembly 76 along the sloped portion 92 may also cause the first hinge assembly 70 to move at least partially toward the retracted position 42. According to the method 600, the lid 18 is disposed below the sloped portion 92 and into the lid opening 94 (step 614). In this configuration, the first hinge assembly 70 and the second hinge assembly 76 are each biased outward to the extended position 40 and toward the respective hinge receptacles 32 defined within the lid opening 94 of the structural cabinet 14. The first and second hinge assemblies 70, 76 are then engaged within the respective hinge receptacles 32 to secure the lid 18 to the structural cabinet 14 in an installed position 110 (step 616). After installation of the lid 18 is complete, the guide members 90 can be removed.

According to various aspects of the device, the methods 400, 500 and 600 can be utilized with various operable panels 12 and within various appliances 16 incorporating operable panels 12. These operable panels 12 are typically rotationally operated with respect to a structural cabinet 14 and can include opposing hinges that are disposed within hinge receptacles 32 of the structural cabinet 14.

The various guide members 90 that are utilized in installing the lid 18 into the installed position 110 can include a guide channel 160 that guides the pin 150 of the first and/or second hinges toward the installed position 110. The use of this guide channel 160 serves to maintain engagement between the pin 150 extending from the lid 18 and the guide members 90. The guide members 90 can be made from various materials that can include, but are not limited to, plastic, metal, metal alloys, composite materials, ceramic, combinations thereof, and other similar materials that can be utilized for installing the lid 18 into the installed position 110 with respect to the structural cabinet 14. In various aspects of the device, the guide member 90 can extend into the lid opening 94 and extend at least partially around the hinge receptacle 32 set within the lid opening 94. Accordingly, the sloped portion 92 can extend below the top surface or outer surface of the structural cabinet 14 and into the lid opening 94. Accordingly, the sloped portion 92 can guide the pin 150 of the various hinge members 34 to the retracted position 42 and maintain this retracted position 42 until the pin 150 is fully aligned or at least partially aligned with the respective hinge apertures 130 for receiving the lid 18 in the installed position 110.

Figure 15:
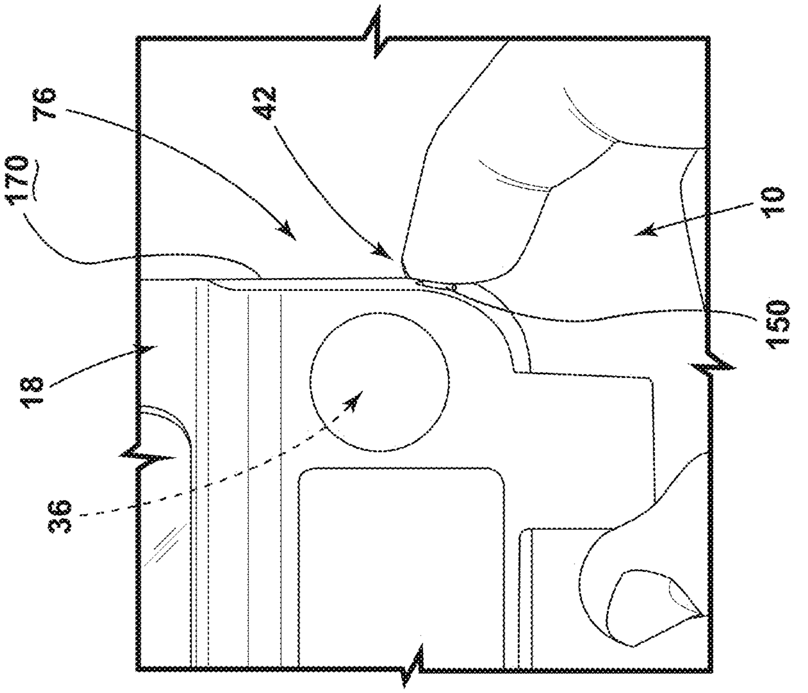
FIG. 15 is a partial perspective view of the lid of FIG. 14 and showing manual operation of the second hinge assembly to the retracted position.
Figure 14:
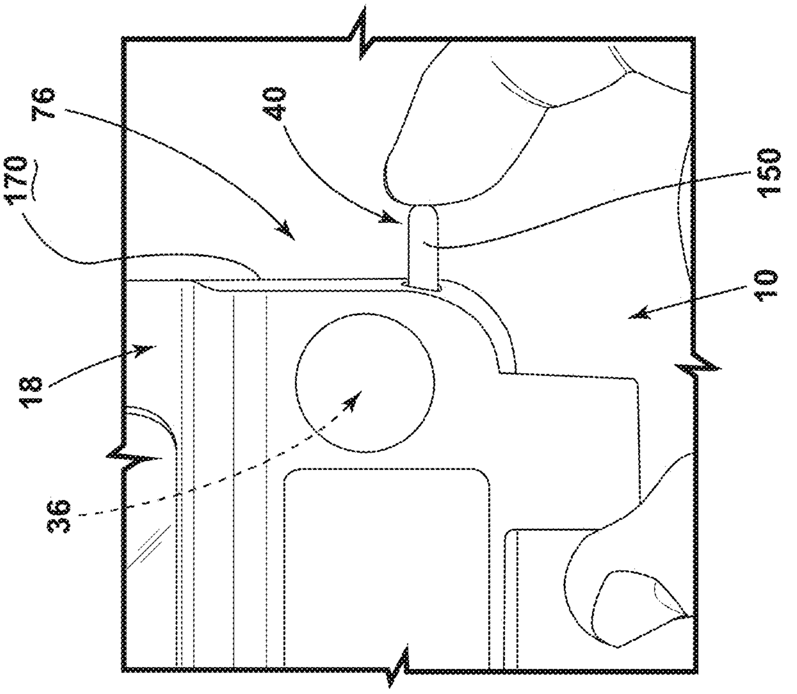
FIG. 14 is a partial perspective view of the lid and the second hinge assembly shown in the extended position.
Figure 16:
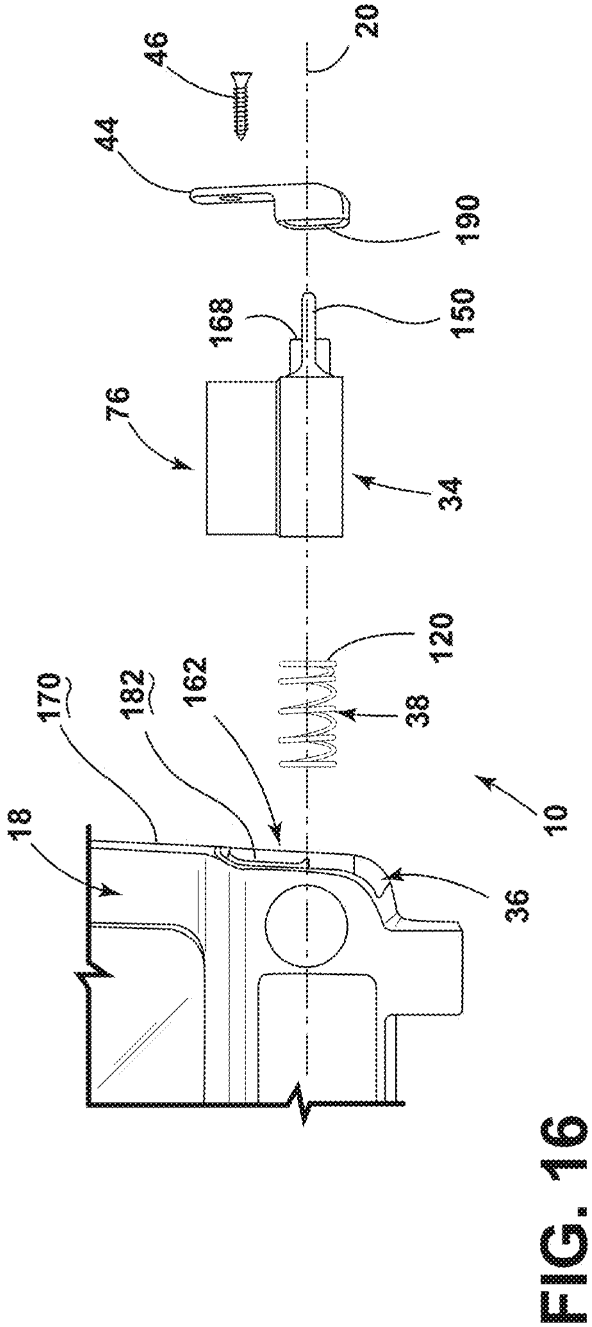
FIG. 16 is an exploded perspective view of the second hinge assembly.
Figure 17:
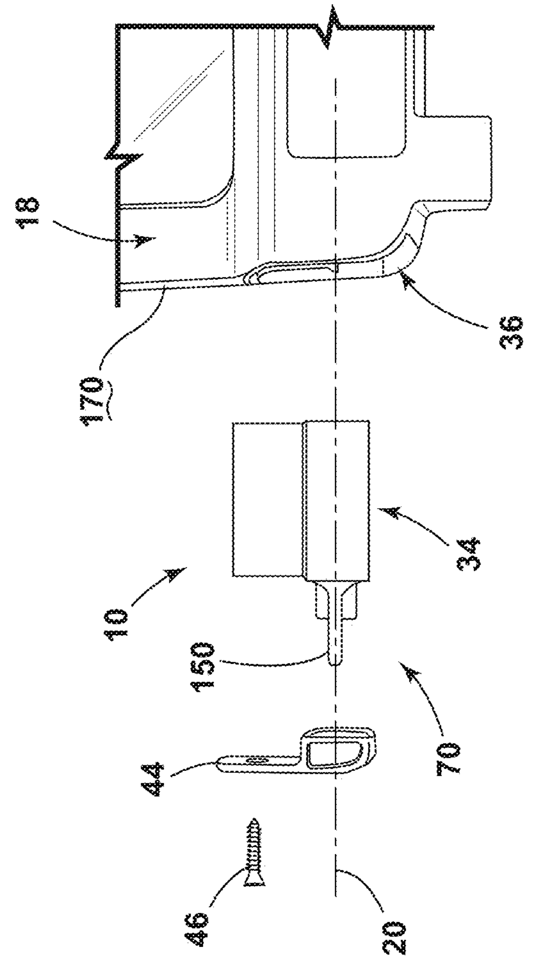
FIG. 17 is an exploded view of the first hinge assembly, and exemplified as a non-retractable hinge assembly of the lid.
Figure 18:
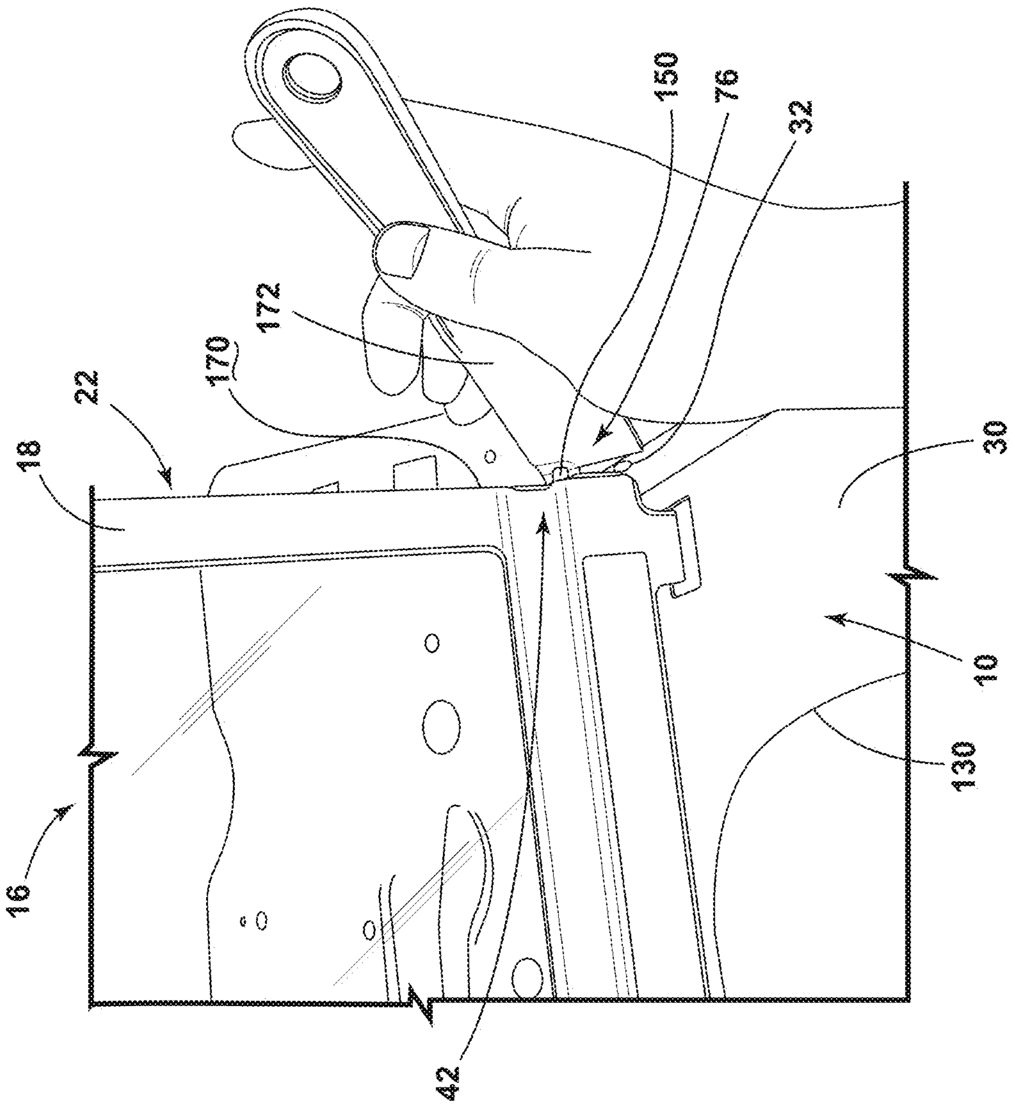
FIG. 18 is a schematic perspective view of a lid for a laundry appliance being installed onto a top panel.
Figure 19:
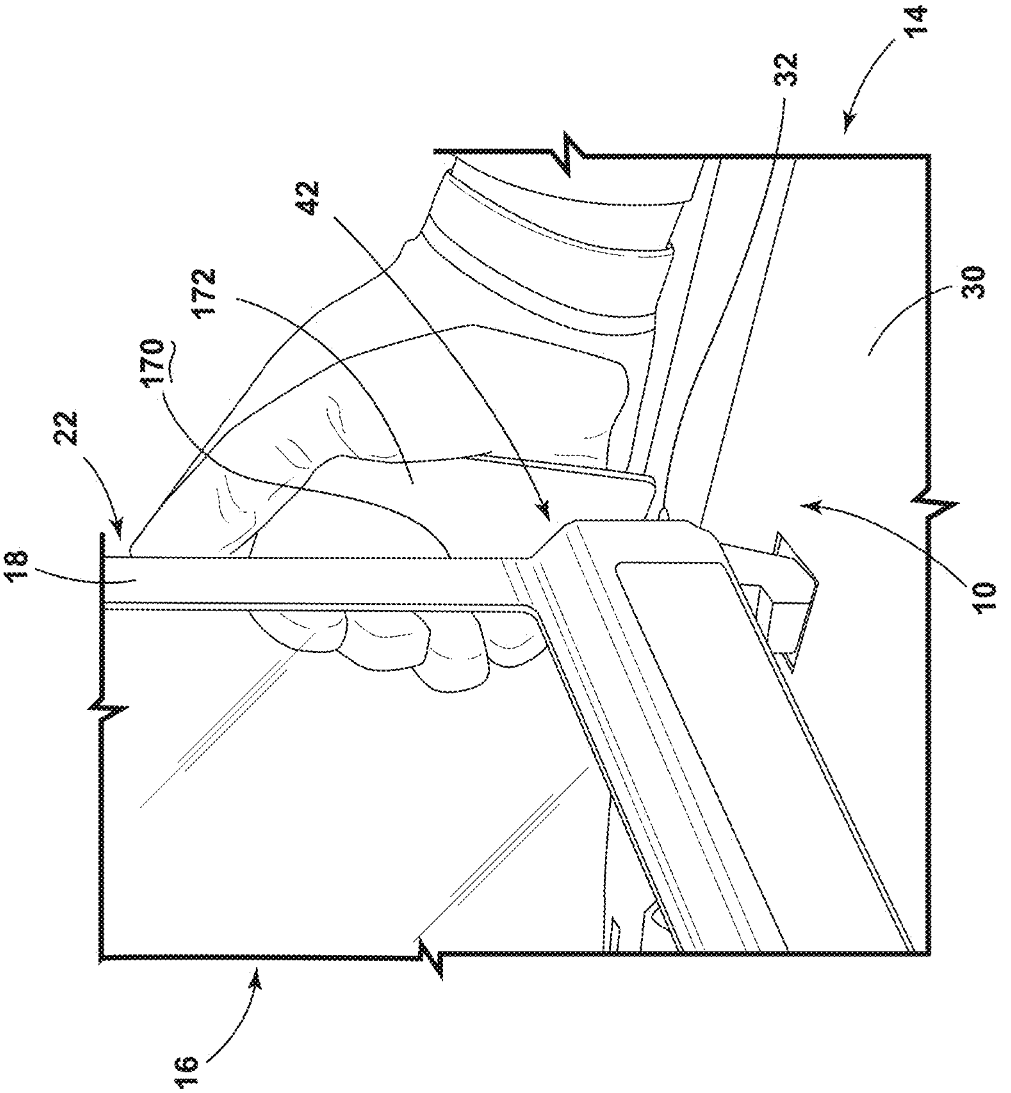
FIG. 19 is a schematic perspective view of a lid being moved into the installed position through the use of a tool for installing the lid and moving the second hinge assembly to the retracted position.
Figure 21:
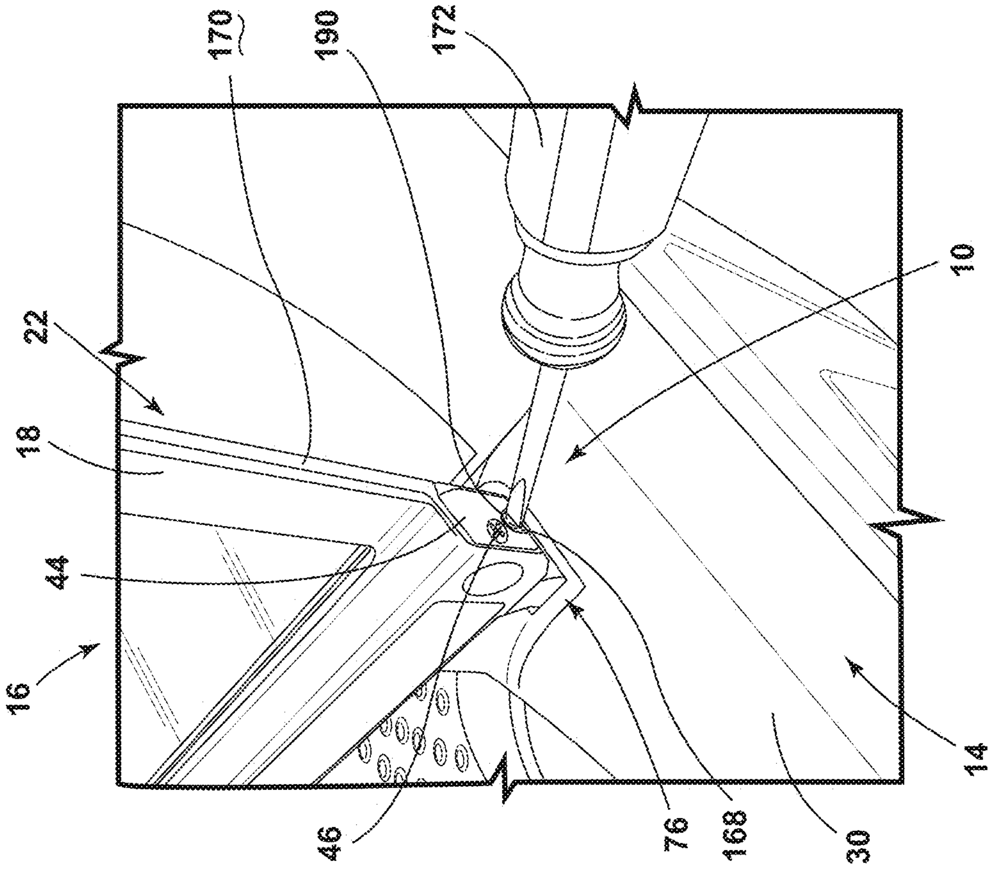
FIG. 21 is a schematic perspective view of a tool operating the maintenance portion of the second hinge assembly to the retracted position for removing the lid from the top panel.
Figure 20:
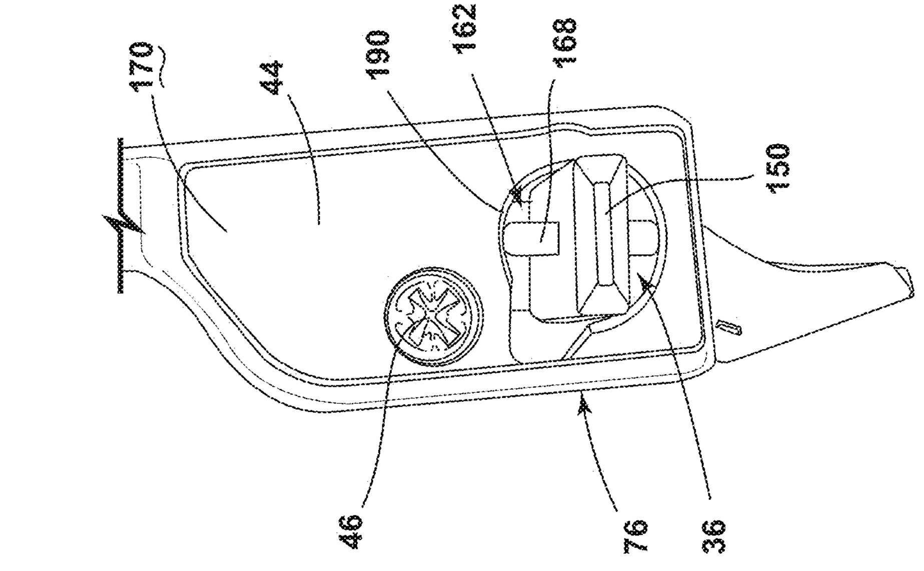
FIG. 20 is a side perspective view of the second hinge assembly for the lid and showing positioning of the maintenance portion of the second hinge assembly.
Figure 22:
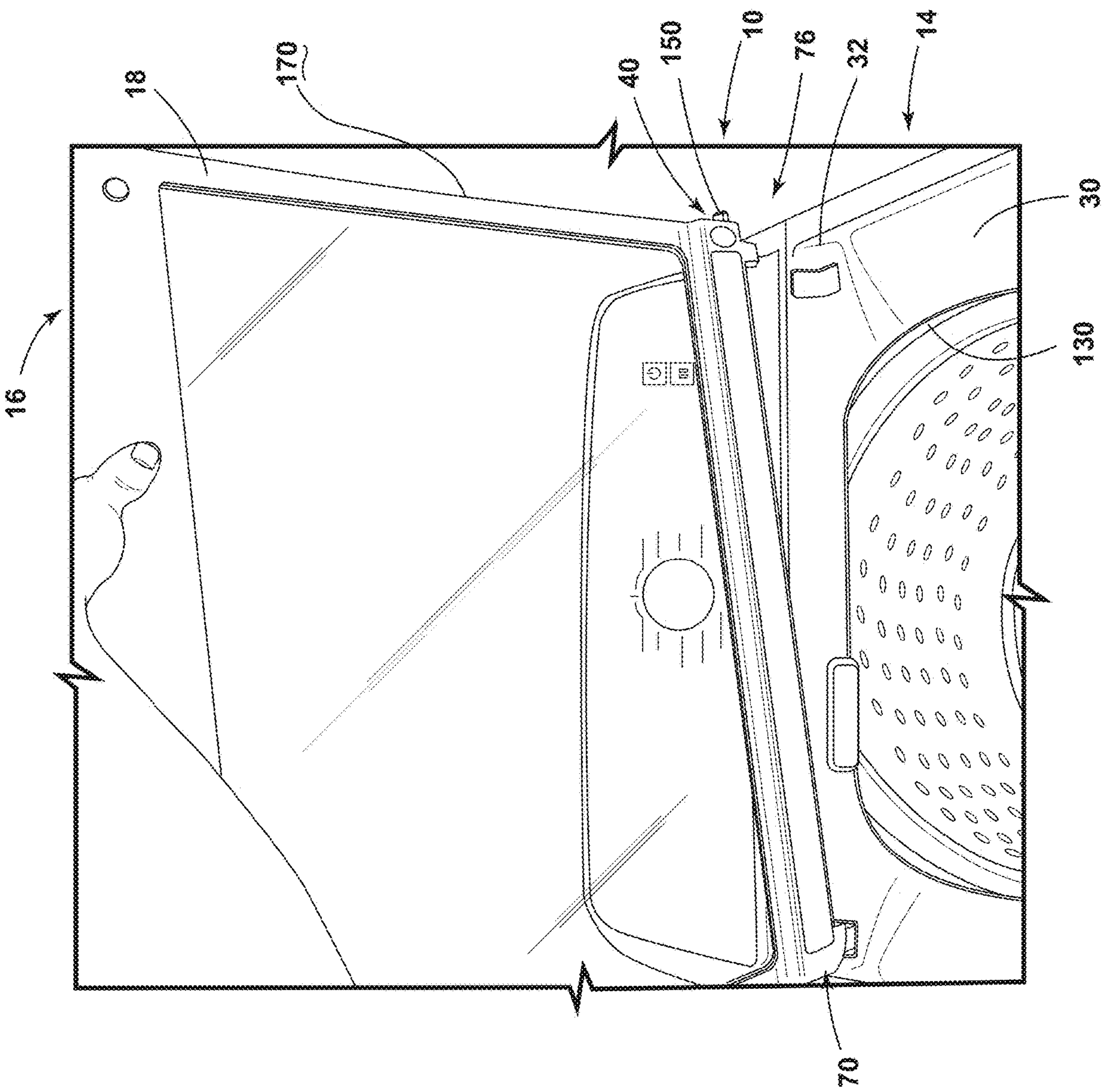
FIG. 22 is the lid removed from the installed position.

According to the various aspects of the device, the guide members 90 can be in the form of fixtures that are attached to the top panel 30 for biasing the at least second hinge assembly 76 to the retracted position 42 for installing the lid 18 onto the top panel 30. It is also contemplated that the guide members 90 can be in the form of tools 172 that can be operated by hand, or can be incorporated within various wearable members for guiding at least the second hinge assembly 76 to the retracted position 42 for sliding the lid 18 past a portion of the top panel 30 and into the installed position 110. It is also contemplated that the installation of the lid 18 into the installed position 110 can be accomplished by hand and without the use of tools 172. In such an embodiment, at least the second hinge assembly 76 can be pressed by hand to the retracted position 42 (as exemplified in FIGS. 14 and 15). In this retracted position 42, the lid 18 can be operated by hand and moved into the installed position 110. When in this installed position 110, the installation spring 120 or other biasing member 38, biases the second hinge assembly 76 outward to the extended position 40 for installing the lid 18 relative to the top panel 30.

It should be understood that within the various aspects of the device, the various biasing members 38 of the second hinge assembly 76 can be repeated within the first hinge assembly 70. It is also contemplated that only the second hinge assembly 76 is operable to the retracted position 42. In such an aspect of the device, it is typical that the first hinge assembly 70 will be axially fixed and not operable to a retracted position 42 similar to that of the second hinge assembly 76. Where the first hinge assembly 70 is axially fixed, it is typical that the first hinge assembly 70 will be placed into the opposing hinge receptacle 96 and the second hinge assembly 76 will then by operated to the retracted position 42 and operated into the installed position 110 relative to the top panel 30.

Where the guide member 90 includes opposing guide members 90 that are set on each side of the lid opening 94, the guide member 90 can include a unitary assembly that extends between opposing sides of the lid opening 94. It is also contemplated that each guide member 90 of the opposing guide members 90 can be a separate member that is separately attached to opposing sides of the recess that defines the lid opening 94. The guide member 90, after installation of the lid 18, can be used as packaging material for protecting the surface of the appliance 16 during manufacture, transport and installation.

Referring now to FIGS. 14-22, the same methods and mechanisms for installing the lid 18 into the installed position 110 relative to the top panel 30 of the cabinet 14 can also be utilized for separating the lid 18 from the top panel 30. It is contemplated that the installation and removal of the lid 18 from the top panel 30 is able to be accomplished while maintaining each of the lid 18 and the top panel 30 for the appliance 16 in an intact configuration. Stated another way, the process for assembling the lid 18 to the top panel 30 and removing the lid 18 from the top panel 30 does not require the removal of any additional components from the lid 18 or the top panel 30. At least the second hinge assembly 76 is operable, by itself, to install the lid 18 and remove the lid 18 relative to the top panel 30. Again, no additional components or parts need be removed from the top panel 30 or the lid 18 to accomplish the installation, maintenance or removal of the lid 18.

Referring again to FIGS. 1-9 and 14-22, the laundry appliance 16 includes the cabinet 14 having the top panel 30 that defines the aperture 190 for selectively accessing the treatment chamber that is defined within the cabinet 14. The lid 18 is rotationally operable relative to the aperture 190 of the top panel 30 between the open and closed positions 22, 24. Hinge assemblies 10 extend between the lid 18 and the top panel 30. These hinge assemblies 10 can include the first hinge assembly 70 and the second hinge assembly 76. Typically, at least the second hinge assembly 76 is selectively retractable into the lid 18 to define the retracted position 42. This second hinge assembly 76 is retracted into a hinge cavity 36 that is defined within a portion of the lid 18. This hinge cavity 36 receives and surrounds the second hinge assembly 76 and provides an operating space 162 within which the second hinge assembly 76 can operate between the extended and retracted positions 40, 42. A biasing member 38, typically the installation spring 120, is included within at least the second hinge assembly 76. This biasing member 38 biases the second hinge assembly 76 outward and to the extended position 40. At least the second hinge assembly 76 is operable to the retracted position 42 to bypass a portion of the top panel 30. Through this bypassing operation, the second hinge assembly 76 can move past a portion of the top panel 30 to be moved into the installed position 110. This operation can be accomplished without scratching or other damage to the top panel 30. As discussed previously, the installed position 110 of the lid 18 is defined by the first and second hinge assemblies 70, 76 being engaged with respective hinge receptacles 32 of the top panel 30.

Referring again to FIGS. 16-22, at least the second hinge assembly 76 can include a maintenance portion 168 that is positioned along an edge surface 170 of the lid 18. This maintenance portion 168 is incorporated within one of a pin 150 and a hinge member 34 of the second hinge assembly 76. Typically, the maintenance portion 168 is integral with the pin 150 of the second hinge assembly 76. When in the installed position 110, the pin 150 extends into the respective hinge receptacle 32 of the top panel 30. At the same time, the maintenance portion 168 of the second hinge assembly 76 is set apart from the top panel 30 and is accessible between the lid 18 and the top panel 30. Accordingly, when the lid 18 is in the installed position 110, a tool 172 can be utilized for accessing the maintenance portion 168 of the second hinge assembly 76 for pushing or otherwise biasing the second hinge assembly 76 to the retracted position 42. By moving the second hinge assembly 76 to the retracted position 42, the pin 150 of the second hinge assembly 76 is removed from the respective hinge receptacle 32 of the top panel 30. In this retracted position 42, the lid 18 can be separated from the top panel 30 while maintaining the lid 18 and the top panel 30 as unitary components.

Referring again to FIGS. 14-22, it is contemplated that each of the first and second hinge assemblies 70, 76 can be operable between the extended and retracted positions 40, 42. In the other aspects of the device, it is contemplated that only the second hinge assembly 76 is operable between the extended and retracted positions 40, 42. In such an aspect, the first hinge assembly 70 is typically fixed in the extended position 40. Accordingly, the exact method of installing the lid 18 onto the top panel 30 can vary depending upon the operability of the first hinge assembly 70 from the extended position 40. Where each of the first and second hinge assemblies 70, 76 are operable between respective extended and retracted positions 40, 42, the lid 18 can be installed such that the first and second hinge assemblies 70, 76 are each biased to the retracted position 42 and then simultaneously moved into the installed position 110 with respect to the top panel 30. Conversely, where only the second hinge assembly 76 is operable between the extended and retracted positions 40, 42, the first hinge assembly 70 is initially positioned within the opposing hinge receptacle 96, and then the second hinge assembly 76 is biased to the retracted position 42 and moved into alignment with the respective hinge receptacle 32 of the top panel 30. It is contemplated that removal or separation of the lid 18 from the top panel 30 is accomplished by operating only one of the first and second hinge assemblies 70, 76 to the retracted position 42 and then rotating the lid 18 away from the installed position 110. The other of the hinge assemblies 10 can then be separated from the respective hinge receptacle 32 of the top panel 30.

As exemplified in FIGS. 9-10 and 14-22, at least the second hinge assembly 76 includes a biasing member 38 that biases the second hinge assembly 76 to the extended position 40. This biasing member 38, typically in the form of the installation spring 120, maintains the second hinge assembly 76 in the extended position 40 to maintain the lid 18 in the installed position 110 relative to the top panel 30. When the second hinge assembly 76 is moved to the retracted position 42, the pin 150 or the maintenance portion 168 of the second hinge assembly 76 can be operated to push the pin 150 and hinge member 34 of the second hinge assembly 76 into the hinge cavity 36 to define the retracted position 42. It is contemplated that the hinge cavity 36 can include a bumper 180 or other similar movement-limiting feature that stops the inward movement of the hinge member 34 of the second hinge assembly 76 to the retracted position 42. This bumper 180 prevents over-compression of the installation spring 120 and also prevents the pin 150 from being placed too far within the hinge cavity 36. In this manner, the bumper 180 prevents the pin 150 from becoming inadvertently blocked by an interior surface 182 of the lid 18 that forms the hinge cavity 36.

Referring again to FIGS. 9, 10 and 14-22, the pin 150 and the maintenance portion 168 of the second hinge assembly 76 are accessible through a cap 44 of the second hinge assembly 76. This cap 44 includes a maintenance aperture 190 that allows for access to the pin 150 and the maintenance portion 168. This maintenance aperture 190 also prevents outward movement of the hinge member 34 beyond the extended position 40. The cap 44 can be attached to the remainder of the lid 18 via a fastener 46 or other similar attachment mechanism or method. Using the maintenance aperture 190 of the cap 44, the first and second hinge assemblies 70, 76 of the lid 18 are operable to place the lid 18 into the installed position 110 and also remove the lid 18 from the installed position 110. As discussed above, the placement and removal of the lid 18 relative to the top panel 30 are accomplished while maintaining a lid 18 and the top panel 30 as a unitary assembly such that no components need to be removed to allow for the separation of the lid 18 and the top panel 30. The only operable component for accomplishing the installation and removal of the lid 18 is the pin 150 and/or maintenance portion 168 of at least the second hinge assembly 76.

According to another aspect of the present disclosure, a laundry appliance includes a cabinet having a top panel that defines an aperture for selectively accessing a treatment chamber defined within the cabinet. A lid is rotationally operable relative to the aperture of the top panel between open and closed positions. Hinge assemblies extend between the lid and the top panel. The hinge assemblies include a first hinge assembly. A second hinge assembly is selectively retractable into the lid to a retracted position. A biasing member biases the second hinge assembly out to an extended position. At least the second hinge assembly is operable to the retracted position to bypass a portion of the top panel to define an installed position where the first and second hinge assemblies are engaged with respective hinge receptacles of the top panel.

According to another aspect, the first hinge assembly includes a respective biasing member that biases the first hinge assembly to a respective extended position.

According to yet another aspect, the second hinge assembly includes a maintenance portion positioned at an edge of the lid. The maintenance portion is incorporated within one of a pin and a hinge member of the second hinge assembly.

According to another aspect of the present disclosure, the maintenance portion is integral with the pin.

According to another aspect, the installed position is defined by the pin extending into the respective hinge receptacle and the maintenance portion is accessible between the lid and the top panel.

According to yet another aspect, when the lid is in the installed position, the maintenance portion is operable to bias the second hinge assembly to the retracted position. The lid is separable from the top panel when the second hinge assembly is in the retracted position.

According to another aspect of the present disclosure, the pin and the maintenance portion are accessible through a cap of the second hinge assembly.

According to another aspect, the lid and the first and second hinge assemblies are operable to place the lid into the installed position and remove the lid from the installed position while maintaining the lid and the first and second hinge assemblies as a unitary assembly.

According to yet another aspect, a method for installing a lid onto an appliance includes positioning a guide structure on a cabinet. A sloped portion of the guide structure is aligned to slope downward and toward a lid opening of the cabinet. At least one of a first hinge and a second hinge are positioned on the sloped portion. The lid is slid downward and along the sloped portion and toward the lid opening. The sloped portion biases the first hinge and the second hinge toward a retracted position. The lid is disposed below the sloped portion and into the lid opening. The first hinge and the second hinge are each biased outward toward respective hinge receptacles of the cabinet. The first and second hinges are engaged within the respective hinge receptacles to secure said lid to the cabinet.

According to another aspect of the present disclosure, the step of positioning the guide structure includes positioning opposing guide members of the guide structure that define respective sloped portions that slope toward the respective hinge receptacles.

According to another aspect, the step of positioning at least one of the first and second hinges on the sloped portion includes positioning the first hinge, defining a damper, positioning the second hinge, and defining a lift-assist mechanism, onto the sloped portions of the opposing guide members.

According to yet another aspect, the damper is a one-way damper that operates only when said lid moves from an open position to a closed position relative to the cabinet.

According to another aspect of the present disclosure, the step of positioning the guide structure includes configuring the sloped portions of the opposing guide members to cooperate with an installation spring of the first hinge and an installation spring of the second hinge, respectively.

According to another aspect, the sloped portions of the opposing guide members define different slopes, wherein the different slopes are calibrated according to the installation springs of the first and second hinges.

According to yet another aspect, the opposing guide members of the guide structure are separate components that are separately attached to the cabinet.

According to another aspect of the present disclosure, a method for installing a lid onto an appliance includes positioning a guide member on a cabinet. A sloped portion of the guide member is aligned to slope downward and toward a lid opening of the cabinet. A first hinge is positioned within a hinge receptacle of respective hinge receptacles within the lid opening. A second hinge is positioned on the sloped portion. The lid is rotated about the respective hinge receptacle and in a downward direction. The second hinge slides along the sloped portion and toward the lid opening. The sloped portion biases at least the second hinge toward a retracted position. The lid is disposed below the sloped portion and into the lid opening. The first hinge and the second hinge are each biased outward toward the respective hinge receptacles of the cabinet. The first and second hinges are engaged within the respective hinge receptacles to secure said lid to the cabinet.

According to another aspect, the step of positioning the first hinge includes positioning a damper of said lid into the hinge receptacle.

According to yet another aspect, the second hinge is biased to the retracted position at least partially by compression of an installation spring of the damper that is positioned within a hinge cavity.

According to another aspect of the present disclosure, the second hinge is a lift-assist mechanism that includes an installation spring and wherein the step of engaging the second hinge with a hinge receptacle of the respective hinge receptacles includes the installation spring biasing the second hinge away from the retracted position and into the hinge receptacle.

According to another aspect, the step of positioning the guide member includes selectively securing the guide member to a surface of a top panel for the cabinet.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for installing a lid onto an appliance comprising steps of:

positioning a guide structure on a cabinet;

aligning sloped portions of the guide structure toward respective hinge receptacles that are disposed within a lid opening of the cabinet;

positioning a first hinge and a second hinge on respective sloped portions;

sliding said lid along the sloped portions and toward the lid opening, wherein the sloped portions bias the at least one of the first hinge and the second hinge, respectively, toward a retracted position;

disposing said lid into an installed position within the lid opening, wherein the first hinge and the second hinge are each biased outward toward the respective hinge receptacles;

engaging the first and second hinges within the respective hinge receptacles to secure said lid to the cabinet, wherein the step of positioning the guide structure includes configuring the sloped portions of the guide structure to cooperate with an installation spring of the first hinge and an installation spring of the second hinge, respectively; and removing the guide structure from the cabinet after the lid is in the installed position.

2. The method of claim 1, wherein the guide structure includes opposing guide members, and wherein the sloped portions of the opposing guide members define different slopes, wherein the different slopes are calibrated according to the installation springs of the first and second hinges.

3. The method of claim 2, wherein the step of positioning the first and second hinges on the sloped portions includes positioning the first hinge and the second hinge onto the sloped portions of the opposing guide members.

4. The method of claim 3, wherein the first hinge defines a damper and the second hinge defines a lift-assist mechanism, and wherein the damper is a one-way damper that operates only when said lid moves from an open position to a closed position relative to the cabinet.

5. The method of claim 1, wherein the sloped portions of the guide structure are positioned to guide a downward movement of the first hinge and the second hinge toward the installed position.

6. The method of claim 2, wherein the opposing guide members of the guide structure are separate components that are separately attached to the cabinet.

7. A method for installing a lid onto an appliance comprising steps of:

positioning a guide member on a cabinet;

aligning a sloped portion of the guide member to slope toward an installed position of said lid, the installed position defined by said lid disposed within a lid opening of the cabinet;

positioning a first hinge assembly within a hinge receptacle of respective hinge receptacles within the lid opening;

positioning a second hinge assembly on the sloped portion;

rotating said lid about the respective hinge receptacles and toward the installed position;

sliding the second hinge assembly along the sloped portion and toward the installed position within the lid opening, wherein the sloped portion biases at least the second hinge assembly toward a retracted position;

disposing said lid into the lid opening, wherein the first hinge assembly and the second hinge assembly are each biased outward toward the respective hinge receptacles of the cabinet;

engaging the first and second hinge assemblies within the respective hinge receptacles to secure said lid to the cabinet in the installed position; and removing the guide member from the cabinet after the lid is in the installed position.

8. The method of claim 7, wherein the step of positioning the first hinge assembly includes positioning a portion of a damper of the first hinge assembly into a hinge receptacle of the respective hinge receptacles, wherein the damper of the first hinge assembly is at least partially disposed within a hinge cavity of the lid.

9. The method of claim 8, wherein the second hinge assembly is biased to the retracted position at least partially by compression of an installation spring of the damper that is positioned within the hinge cavity.

10. The method of claim 7, wherein the second hinge assembly is a lift-assist mechanism that includes an installation spring.

11. The method of claim 7, wherein the step of sliding the second hinge assembly along the sloped portion and toward the installed position within the lid opening includes moving the second hinge assembly in a downward direction toward the installed position.

12. The method of claim 7, wherein the step of positioning the guide member includes selectively securing the guide member to a surface of a top panel for the cabinet.

13. The method of claim 7, wherein the step of sliding the second hinge assembly along the sloped portion and toward the installed position includes sliding the second hinge assembly along a guide channel of the guide member that guides the second hinge assembly toward the respective hinge receptacle.

* * * * *